United States Patent Office

Re. 28,091
Reissued July 30, 1974

28,091
PROTEIN FIBER FORMING

Wilhelmus Heusdens, Wilmette, Ill., and Christopher W. Frederiksen, St. Louis, Mo., assignors to Ralston Purina Company, St. Louis, Mo.

No Drawing. Original No. 3,662,671, dated May 16, 1972, Ser. No. 825,973, May 19, 1969. Application for reissue Oct. 30, 1972, Ser. No. 302,054
Int. Cl. A23j *3/00;* A23l *1/20*
U.S. Cl. 426—148 32 Claims

Matter enclosed in heavy brackets [ ] appears in the original patent but forms no part of this reissue specification; matter printed in italics indicates the additions made by reissue.

ABSTRACT OF THE DISCLOSURE

A process of continuously forming tender textured protein structures is disclosed. The structures are formed from an aqueous slurry of a proteinaceous material having a solids content of up to about 35 percent by weight. The proteinaceous slurry is formed into textured filaments or fibers by continuously heating the slurry under pressure and cooling the slurry.

Food scientists have been interested for some time in providing textured, fibrous protein products which can be produced from non-textured edible protein sources. The shortage of protein for human consumption is the most pressing food problem of our time. The problem is compounded by the difficulty in providing palatable protein foods from the available sources of protein. Many protein sources such as animal protein concentrates and by-products, cereal proteins, oilseed protein and microbial protein have not been fully utilized for human food because they are not in a form which is acceptable to humans. Humans prefer the mouth-feel of meat, which has definite texture and a fibrous quality. Most animal protein concentrates and by-products, cereal proteins, oilseed protein concentrates and microbial protein concentrates are in a paste or an amorphous powdered form. To make animal protein, oilseed protein and microbial protein useful it is desirable to process them to give them a textured or fibrous quality which is appealing to humans.

Food scientists have resorted to a variety of techniques to produce structured protein. The most common and successful technique has been the wet spinning process such as that disclosed in the U.S. Pat. No. 2,730,447 to R. A. Boyer. The wet spinning process produces fibers by extruding a plurality of fine streams of an aqueous solution of protein into a chemical coagulating bath. The protein coagulates into fine fibers which are collected together and treated to form an edible textured protein. Other methods of forming textured protein are extrusion of proteinaceous material as disclosed by U.S. Pat. No. 3,142,571 to J. M. McAnelly and heat coagulation of undenatured protein as disclosed by U.S. Pat. No. 3,047,395 to I. I. Rusoff et al.

The above methods of producing textured protein individually or collectively have a number of drawbacks, including difficulty of use in commercial practice, requirement of special equipment necessitating a large capital expenditure to commercialize, and requirement of a number of operative steps and a large amount of reagent chemicals in proportion to the amount of fibered protein produced. A particular problem faced by current methods of producing textured or fibered protein is the difficulty in producing a bland product, particularly when an oilseed protein is used as the starting material. Oilseeds, such as soybean, contain compounds which produce flatulence and an "off" or "beany" flavor in products which are made from the oilseed protein. To remove the flatulence causing compounds and "off" or "heavy" flavors from extruded protein fibers, for example, it is necessary to subject the fibers to a series of washing steps to remove the objectionable compounds. The washing steps make the process of producing fibered protein more complex and expensive.

The process of this invention produces a tender, bland fiber which can be directly incorporated into simulated meat or other products to provide a pleasing taste and mouthfeel and to form a food product which is acceptable for human consumption. The bland food product can be produced directly from protein sources such as oilseed protein, having a high proportion of undesirable components, e.g., "off" flavoring and flatulence producing compounds, without the necessity of intermediate isolation and washing steps. The starting material for the process need not be protein of high purity. By practicing the process of this invention it is possible to make a light, bland, flatulence free product directly from proteinaceous materials having a high content of "off" flavoring materials and only a moderate protein content. The resulting product has a high protein content and can be directly incorporated into simulated meat, meat extenders, or other protein products without extensive washing steps. The process can be carried out on simple, readily available equipment and does not require a large amount of reagent chemicals. The process is inexpensive and simple to operate.

The invention involves heating a slurry of proteinaceous material by conducting the slurry through a heat exchanger under high pressure. The slurry can have a solids content of about 20 to 35 percent or more by weight, depending on the limitations of the pump. After the proteinaceous slurry passes through the heat exchanger, it may be cooled and pumped into a collecting zone. The textured protein is recovered from the collecting zone.

A variety of proteinaceous materials may be used to produce fibers by the process of this invention; vegetable protein such as soy or other oilseed protein materials, e.g., oilseed meals such as soybean meal, sesame meal, cottonseed meal or peanut meal; animal protein such as albumen and casein; and microbial protein, from sources such as brewer's yeast, torula yeast, or petro protein may be used in the process of this invention.

The extract reaction which produces the fibers is not known. However, it is believed that the protein reacts under the temperature and pressure conditions of the process to produce elongated multi-molecular protein polymers. For the process to produce the reacted protein in the elongated filaments which are most desirable the protein starting material should be in a sufficiently reactive form. This is particularly important when the starting material is an oilseed meal material such as soy flour or flakes. The proteinaceous material must be freed from the fibrous cellular material which surrounds it and made available on the surfaces of the cellular material. The proteinaceous material should be in a hydrated or soluble state to be reactive. If the native protein is not in a reactive form, it may be hydrated or made more soluble in several ways: by finely grinding an aqueous slurry of the protein; by subjecting an aqueous slurry of the protein to a change in pH, either by raising the pH to a point well above the isoelectric point or by lowering the pH to a point below the isoelectric point; and by a combination of finely grinding and pH change treatment. Care must be used in adjusting the protein pH so that the material is not hydrolyzed to a point that it will not react when processed by the method of the invention. A high pH between about 8 and 12 has proven to be satisfactory. After the proteinaceous material has been treated to make it sufficiently reactive, the pH of the slurry can be readjusted to the isoelectric point range, for example, between about 4 and 6 for soy protein, and the slurry reacted by the described process.

If the proper reagent materials are used, it may be possible to produce the protein filaments over a much broader pH range. The salts and hydroxides of certain polyvalent metals act as linking agents which permit the reaction to be carried out to form protein filaments from a slurry having a pH range of about 4 to 11. Suitable linking agents may be calcium hydroxide, calcium chloride, aluminum sulfate and other salts and hydroxides of bivalent and trivalent metals such as magnesium and copper. It is believed that the polyvalent metal ions promote or participate in the reaction which forms the protein structures.

The addition of phosphate ion is beneficial, particularly when the starting material contains protein of moderate purity such as soy flakes, which contain about 50 percent protein. Trisodium phosphate is a convenient reagent to use to supply phosphate ion, since it can be used to perform two functions. The trisodium phosphate supplies the needed phosphate ions and also raises the pH to a point well above the isoelectric point to make the proteinaceous material more reactive.

The reaction takes place as a function of time, temperature and pressure. Temperatures of between about 240° to 315° F. are preferred, especially for soy protein. The protein will degrade if heated at too high a temperature for too long. After the protein material is heated it may be subjected to a cooling step, generally cooling will be to a temperature of 160° to 210° F., depending on the protein-material used.

The process may be operated over a wide pressure range; pressures above about 50 p.s.i.g. are satisfactory to produce the desired texture. Preferably, back pressures of between 50 and 5,000 p.s.i.g. are used. A restrictive orifice may be placed in the exit line from the process equipment. The orifice serves to help maintain a back pressure on the system and to control the shape of the product. In general, circular orifices between 0.015 and 0.030 inch in diameter have proven to be satisfactory. Rectangular orifices have also proven to be satisfactory for some applications. A rectangular orifice 0.375 x 0.0625 inch has been used to produce flattened filaments.

The method of producing edible protein structures will be more apparent from the following examples which are chosen from the many specific combinations which are possible to illustrate the invention and are not to be construed as limiting the scope of the invention.

EXAMPLE 1

Twenty pounds of solvent extracted soy flakes were slurried with 80 pounds of water. $Ca(OH)_2$ was added to raise the pH of the slurry to 10.3. The slurry was ground on a Fitz mill, left standing for 30 minutes, the pH was adjusted to 4.5 adding 50 percent $H_2SO_4$ solution, and the slurry was ground again. The solids content of the slurry was about 20 percent by weight and it had a protein purity of about 57 percent. The slurry was pumped at a pressure of from 200 to 1,000 p.s.i.g. through a four coil heat exchanger made of 80 feet of ⅜ inch x 0.209 inch ID seamless stainless steel tubing in a 6 inch pipe. The temperature of the heat exchanger was set at 290° F. The slurry was then cooled to 185° F. by conducting it through a cooler. The cooled slurry was expelled through a 0.028 inch diameter nozzle into a collecting zone. The protein was recovered as small, discrete textured particles.

EXAMPLE 2

Fifty pounds of high DPI soybean flakes containing 50 percent by weight protein was ground to a particle size so that 99% of the material would pass through a number 200 U.S. Standard Sieve. The ground material was then slurried with 72 pounds of water and 2 pounds of $Na_3PO_4$ for 30 minutes to obtain a slurry having 35 percent solids and a pH of 8.0. The pH of the slurry was reduced to 5.0 by adding 4,000 ml. of a 25 percent citric acid solution. The slurry was pumped through the heat exchanger described in Example 1 at a pump pressure of 2,000 to 3,000 p.s.i.g. and a heat exchanger temperature of 290° to 300° F. The treated slurry was expelled through a 1/16 inch x ½ inch rectangular orifice onto a screen. As soon as the treated slurry was observed to leave the orifice the slurry fed to the heat exchanger was cut off and a stream of cold water was pumped through the process. When the material leaving the orifice was observed to be clear the slurry was again fed to the process. The cycling of slurry and cold water was repeated through the run. Light, bland fibers were recovered from the screen. The recovered fibers contained about 50 percent protein on a wet basis. On a dry basis the stachyose (flatulence factor) was reduced from 6 percent to 1½ percent.

EXAMPLE 3

Fifty pounds of ground high DPI flakes (50 percent protein was slurried with 79 pounds of water and 2 pounds of $Na_3PO_4$ by grinding in a Fitz mill. The pH of the slurry was about 8.0. The slurry pH was reduced to 4.5 with a 50 percent solution of citric acid. The slurry was pumped through the heat exchanger described in Example 1 at a pump pressure of 1,000 to 3,000 p.s.i.g. and a heat exchanger temperature of 280° F. The treated slurry was expelled through a 0.052 inch diameter orifice into a collecting zone using the alternating feed-cold water technique of Example 2. Long, bland fibers were recovered which contained about 50 percent protein.

EXAMPLE 4

The slurry prepared as described in Example 3 was pumped through the heat exchanger described in Example 1 at a pump pressure of 3,000 p.s.i.g. and a heat exchanger temperature of 280° F. The treated slurry was expelled through a 0.052 inch diameter orifice which was submerged in a bath of cold water. Short, chopped fibers were recovered from the water bath. The fibers were light, bland and contained 72 percent protein.

EXAMPLE 5

The slurry prepared as described in Example 3 was pumped through the heat exchanger described in Example 1 at a pump pressure of 3,000 p.s.i.g. and a heat exchanger temperature of 300° F. The treated slurry was expelled through a 0.052 inch diameter orifice into a collection zone. A continuous filament was recovered from the collection zone. The recovered filament was light, bland and contained 53 percent protein. The recovered fibers could be combined with other materials to produce a high grade meat extender. To make a quality meat extender 48 parts by weight of recovered fibers were mixed with 48 parts by weight water and 4 parts by weight of combined salt, albumen, whey and a tracer. The meat extender could be used to make up as much as 50 percent by weight of sandwich patties when combined with lean muscle meat. The extended patties had good meat-like flavor and texture. The meat extender has the additional advantage of retaining the moisture and fat upon frying which prevents shrinkage and improves nutritional value of the meat.

EXAMPLE 6

One hundred parts of soy flour (50 percent pure protein), 35 parts vegetable fat, 15 parts of a 20 percent solution of trisodium phosphate, and 125 parts of water were slurried together. The pH of the slurry was adjusted to 5.0 by adding 40 parts of a saturated critic acid solution to the slurry. The slurry was pumped through a direct steam injection heat exchanger where steam was injected directly into the slurry to raise the temperature of the slurry to 305° F. The retention time in the heat exchanger was about four seconds. The slurry was expelled through a circular nozzle and was cooled by falling about two feet through ambient air to a collecting zone. A back pressure of 60 p.s.i.g. was maintained on the system.

The product was recovered as small discrete textured particles.

We claim:

1. A method of continuously forming elongated tender protein filaments from an oilseed proteinaceous material comprising:

a. forming a slurry of an oilseed proteinaceous material containing off flavors with water, the slurry having a proteinaceous solids content of between about 20 and 35 percent by weight, b. treating the slurry to place the proteinaceous material in a sufficiently reactive form to produce elongated protein filaments by raising the pH of the slurry to well above the isoelectric point of the slurry and then lowering the slurry pH to between about 4 and 6, c. continuously conducting the treated proteinaceous slurry under pressure suitable to produce elongated tender protein filaments through a heat exchange zone and heating the slurry to a temperature between about 240° and 315° F. for a period of time sufficient to produce elongated tender protein filaments in the slurry, continuously removing the heated slurry and elongated protein fibers through an orifice to a collecting zone, and d. recovering tender elongated protein filaments from the slurry.

2. The process of claim 1 wherein the proteinaceous material is solvent extracted soybean.

3. The method of claim 1 wherein the slurry is processed at a pressure between about 50 and 5000 p.s.i.g.

4. The process of claim 1 wherein the slurry is heated with an injection heat exchanger.

5. The process of claim 1 wherein a source of phosphate ion is added to the treated slurry in proportions of about 3–4 percent by weight of the proteinaceous material.

[6. The product produced by the process of claim 1.]

7. A process of continuously forming elongated tender protein filaments from an oilseed proteinaceous material comprising:

a. forming a slurry of an oilseed proteinaceous material containing off flavors with water, the slurry having a proteinaceous solids content of between about 20 and 35 percent by weight, b. treating the slurry by raising the pH of the slurry to place the proteinaceous material in a sufficiently reactive form to produce elongated protein filaments to between about 4 and 11 with hydroxides and salts of polyvalent linking agents selected from the group consisting of calcium, aluminum, magnesium, and adding a source of phosphate ion to the slurry, the source of phosphate ion being added in proportions of about 3–4 percent by weight of the proteinaceous material, c. continuously conducting the treated proteinaceous slurry under pressure suitable to produce elongated tender protein filaments through a heat exchange zone to heat the slurry to a temperature between about 240° to 315° F. for a period of time sufficient to produce elongated tender protein filaments in the slurry and continuously removing the heated slurry and elongated protein fibers through an orifice to a collecting zone, and d. recovering tender elongated protein filaments from the protein slurry.

8. The process of claim 7 wherein the source of phosphate ion is trisodium phosphate.

9. The product produced by the process of claim 7.

*10. A method of continuously forming discrete elongated tender protein filaments from proteinaceous material comprising:*

*(a) forming a slurry of an oilseed proteinaceous material containing off flavors with water, the slurry having a proteinaceous solids content of between about 20 and 35% by weight,*

*(b) hydrating the proteinaceous material in the slurry to place the proteinaceous material in a sufficiently reactive form to produce elongated protein filaments,*

*(c) forming discrete elongated protein filaments by continuously conducting the proteinaceous slurry under pressure through a heat exchange zone and heating the slurry to a temperature between 240° and 315° F. for a sufficient period of time that elongated tender filaments can be caused to separate from the remaining constituents of the slurry, continuously removing the heated slurry from said zone through a back pressure creating orifice and discharging the formed discrete elongated filaments and remaining constituents of the slurry into a collecting zone, and*

*(d) in said collecting zone, separating the tender elongated protein filaments from the remaining constituents of the slurry and recovering said discrete filaments.*

*11. The method of Claim 10 wherein the step of hydrating the proteinaceous material in the slurry is performed by grinding the slurry.*

*12. The method of Claim 10 wherein the hydrating of the proteinaceous material in the slurry to place it in reactive form is performed by raising the pH of the slurry to well above the isoelectric point of the slurry and then lowering the pH to between about 4 and 6.*

*13. The method of Claim 10 wherein the hydrating step includes adjusting the pH of the slurry to between about 4 and 11 by the addition of hydroxides and salts of polyvalent linking agents selected from the group consisting of calcium, aluminum, magnesium and adding a source of phosphate ion to the slurry prior to conducting the slurry through the heat exchange zone, the source of phosphate ion being added in proportions of about 3 to 4% by weight of the proteinaceous material.*

*14. The process of Claim 13 wherein the source of phosphate ion is trisodium phosphate.*

*15. The method of Claim 10 wherein the back pressure to which the slurry is subjected in the heat exchange zone is between about 50 and 5000 p.s.i.g.*

*16. The process of Claim 10 wherein the slurry is heated with an injection heat exchanger in the heat exchange zone.*

*17. The process of Claim 10 wherein a source of phosphate ion is added to the hydrated slurry in proportions of about 3–4 percent by weight of the proteinaceous material prior to conducting the slurry through the heat exchange zone.*

*18. The process of Claim 10 wherein the slurry is heated with an indirect heat exchanger in the heat exchange zone.*

*19. A method of continuously forming discrete elongated tender protein filaments from proteinaceous material comprising:*

*(a) forming a slurry of an oilseed proteinaceous material containing off flavors with water, the slurry having a proteinaceous solids content of between about 20 and 35% by weight,*

*(b) hydrating the proteinaceous material in the slurry to place the proteinaceous material in a sufficiently reactive form to produce elongated protein filaments,*

*(c) forming discrete elongated protein filaments by continuously conducting the proteinaceous slurry under pressure through a heat exchange zone and heating the slurry to a temperature above 240° F. and less than that which will degrade the protein while the protein is subjected to such temperature for a sufficient period of time that elongated tender filaments can be caused to separate from the remaining constituents of the slurry, continuously removing the heated slurry from said zone through a back pressure creating orifice and discharging the formed discrete elongated filaments and remaining constituents of the slurry into a collecting zone, and*

*(d) in said collecting zone, separating the tender elongated protein filaments from the remaining constitu-*

*ents of the slurry and recovering said discrete filaments.*

*20. The method of Claim 19 wherein the step of hydrating the proteinaceous material in the slurry is performed by grinding the slurry.*

*21. The method of Claim 19 wherein the hydrating of the proteinaceous material in the slurry to place it in reactive form is performed by raising the pH of the slurry to well above the isoelectric point of the slurry and then lowering the pH to between about 4 and 6.*

*22. The method of Claim 19 wherein the hydrating step includes adjusting the pH of the slurry to between about 4 and 11 by the addition of hydroxides and salts of polyvalent linking agents selected from the group consisting of calcium, aluminum, magnesium and adding a source of phosphate ion to the slurry prior to conducting the slurry through the heat exchange zone, the source of phosphate ion being added in proportions of about 3 to 4% by weight of the proteinaceous material.*

*23. The process of Claim 22 wherein the source of phosphate ion is trisodium phosphate.*

*24. The method of Claim 19 wherein the back pressure to which the slurry is subjected in the heat exchange zone is between about 50 and 5000 p.s.i.g.*

*25. The process of Claim 19 wherein the slurry is heated with an injection heat exchanger in the heat exchange zone.*

*26. The process of Claim 19 wherein a source of phosphate ion is added to the hydrated slurry in proportions of about 3–4 percent by weight of the proteinaceous material prior to conducting the slurry through the heat exchange zone.*

*27. The process of Claim 19 wherein the slurry is heated with an indirect heat exchanger in the heat exchange zone.*

*28. The process of Claim 19 wherein the proteinaceous material is solvent extracted soybeans.*

*29. A method of continuously forming discrete elongated tender protein filaments from proteinaceous material comprising:*

*(a) providing a hydrated oilseed proteinaceous material containing off flavors and forming a slurry of the proteinaceous material with water, the slurry having a proteinaceous solids content of between about 20 and 35% by weight, and the hydrated proteinaceous material in the slurry being in a form to place the proteinaceous material in a sufficiently reactive form to produce elongated protein filaments,*

*(b) forming discrete elongated protein filaments by continuously conducting the proteinaceous slurry under pressure through a heat exchange zone and heating the slurry to a temperature above 240 ° F. and less than that which will degrade the protein while the protein is subjected to such temperature for a sufficient period of time that elongated tender filaments can be caused to separate from the remaining constituents of the slurry, continuously removing the heated slurry from said zone through a back pressure creating orifice and discharging the formed discrete elongated filaments and remaining constituents of the slurry into a collecting zone, and*

*(c) in said collecting zone, separating the tender elongated protein filaments from the remaining constituents of the slurry and recovering said discrete filaments.*

*30. The method of Claim 29 wherein the back pressure to which the slurry is subjected in the heat exchange zone is between about 50 and 5000 p.s.i.g.*

*31. The process of Claim 29 wherein the slurry is heated with an injection heat exchanger in the heat exchange zone.*

*32. The process of Claim 29 wherein the slurry is heated with an indirect heat exchanger in the heat exchange zone.*

*33. The product produced by the process of Claim 29.*

References Cited

The following references, cited by the Examiner, are of record in the patented file of this patent or the original patent.

UNITED STATES PATENTS

| | | | |
|---|---|---|---|
| 3,001,875 | 9/1961 | Sair | 99—17 |
| 3,047,395 | 7/1962 | Rusoff | 99—14 |
| 3,127,388 | 3/1964 | Johnson | 260—123.5 |
| 3,488,770 | 1/1970 | Atkinson | 99—17 |

A. LOUIS MONACELL, Primary Examiner

J. R. HOFFMAN, Assistant Examiner

U.S. Cl. X.R.

260—123.5; 426—205, 364, 506, 507